US012547751B2

(12) United States Patent
Gagnon et al.

(10) Patent No.: US 12,547,751 B2
(45) Date of Patent: Feb. 10, 2026

(54) DATABASE SYSTEM CROSS-ENTITY ACCOUNT PROFILE SECURED ACCESS CONTROL AND PERMISSION ENFORCEMENT

(71) Applicant: Salesforce, Inc., San Francisco, CA (US)

(72) Inventors: Chantal Gagnon, Ontario (CA); Christina Marchetti, Marshall, CA (US); Emmanuel Del Rio Sarmiento, Mexico City (MX)

(73) Assignee: Salesforce, Inc., San Francisco, CA (US)

( * ) Notice: Subject to any disclaimer, the term of this patent is extended or adjusted under 35 U.S.C. 154(b) by 200 days.

(21) Appl. No.: 18/428,408

(22) Filed: Jan. 31, 2024

(65) Prior Publication Data

US 2025/0245365 A1 Jul. 31, 2025

(51) Int. Cl.
*H04L 29/06* (2006.01)
*G06F 21/62* (2013.01)

(52) U.S. Cl.
CPC .............................. *G06F 21/6218* (2013.01)

(58) Field of Classification Search
CPC . H04L 63/083; H04L 63/102; H04L 63/1491; G06F 21/6218
See application file for complete search history.

(56) References Cited

U.S. PATENT DOCUMENTS

| 2018/0295109 | A1* | 10/2018 | Wang ................. H04L 63/0471 |
| 2019/0014120 | A1* | 1/2019 | Drabant ............... H04L 63/104 |
| 2019/0340251 | A1* | 11/2019 | Peddada ................. H04L 9/16 |
| 2019/0372766 | A1* | 12/2019 | Bahrenburg ............. H04L 9/30 |

* cited by examiner

Primary Examiner — Wasika Nipa
(74) Attorney, Agent, or Firm — Polygon IP, LLP (57) ABSTRACT

A system may include a communication interface receiving information characterizing a customer of a first database tenant of a plurality of database tenants accessing customer relations management services. The system may also include a database system storing one or more database records including the information characterizing the customer and being stored in a profile corresponding with the customer. The database system may receive a request to determine content to provide to the customer in association with an interaction between the customer and a second database tenant. A recommended content item may be determined based at least in part on the one or more database records. A message including an instruction for presenting the recommended content item in a user interface may be transmitted from the database system to a client machine associated with the customer.

11 Claims, 8 Drawing Sheets

DATABASE SYSTEM CROSS-ENTITY ACCOUNT PROFILE SECURED ACCESS CONTROL AND PERMISSION ENFORCEMENT

FIELD OF TECHNOLOGY

This patent application relates generally to database systems, and more specifically to information access control in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Many cloud computing services involving storing personal information about individuals in database systems. However, the collection and storage of such information gives rise to a tension. On one hand, storing and applying such personal information is an important aspect of cloud-based infrastructures such as commerce-related applications. On the other hand, storing and applying personal information creates significant privacy concerns. Although such concerns can be mitigated by providing individuals with choices about how their personal data is collected and shared, consumers are then faced with the need to specify various preferences and controls across a range of interactions with different entities. Accordingly, improved technologies for securely storing and applying personal data are needed.

BRIEF DESCRIPTION OF THE DRAWINGS

The included drawings are for illustrative purposes and serve only to provide examples of possible structures and operations for the disclosed inventive systems, apparatus, methods, and computer program products for cross-entity account profile creation, access control, and usage in a database system. These drawings in no way limit any changes in form and detail that may be made by one skilled in the art without departing from the spirit and scope of the disclosed implementations.

DETAILED DESCRIPTION

Consumers face a number of challenges and frustrations when interacting with businesses that employ conventional business-to-consumer management systems. At a high level, a consumer has separate relationships with potentially many different businesses, requiring the consumer to manage multiple personal profiles and specify preferences for each of these profiles. If data is not shared across different businesses, then consumers face a lack of a tailored consumer experience and increased advertising noise in the form of inaccurate product recommendations. If data is shared across different businesses, then consumers experience a lack of control and transparency over how their personal data is used and shared.

Businesses employing conventional business-to-consumer management systems also face a number of challenges and frustrations. Because most consumer information is stored in business-specific profiles, a business interacting with a new customer typically does not have access to pre-existing information about that customer during their initial interaction. Several interactions are then typically needed to build a consumer profile and earn customer trust and loyalty. However, the siloed nature of business-specific consumer profiles mean that consumer profiles and preferences tend to quickly become outdated, making it difficult to build and maintain strong, relevant customer relationships.

In contrast to conventional techniques, techniques and mechanisms described herein provide for business-to-consumer management systems that provide for a consumer meta-profile that spans multiple businesses. According to various embodiments, a meta-profile may provide a single, comprehensive record of a consumer's personal preferences and behaviors across digital interactions with business-to-consumer businesses. This meta-profile may be securely housed in a digital vault owned and managed by a cloud computing system service provider providing cloud computing services to a range of business-to-consumer businesses. Those businesses can then access the meta-profile to provide personalized consumer experiences based on information generated in the course of interactions between a customer across various businesses.

According to various embodiments, consumers may opt in to data sharing across businesses, specifying terms and conditions governing the sharing and use of their personal data. Consumers may also specify global preferences with business-to-consumer companies that access their meta-profile, allowing the consumer a personalized experience even with a business with which the consumer has not yet interacted. At the same time, customers may still specify preferences and data access permissions on a per-company basis if desired.

In some embodiments, a cloud computing system may employ an AI-driven multi-dimensional weighted scoring algorithm to develop a nuanced view of a consumer's interests and needs based on comprehensive data across business-to-consumer interactions with different businesses. The system may allow real-time or near real-time feedback and transparently show how closely product recommendations align with stored preferences (e.g., a 95% match with running shoes).

In some embodiments, the system may enhance both trust and security for consumers interacting with multiple business-to-consumer businesses. Centralized storage can add an additional layer of credibility and safety for consumers, reassuring them that their personal data is managed responsibly. Such an approach can shift the perspective on personal data collection from invasive to genuinely personalized.

Consider the example of Alexandra, a consumer with an existing business-to-consumer relationship with a business Acme. Alexandra has previous visited Acme's digital storefront searching for a gift, but upon visiting Acme again receives an unhelpful recommendation. When Acme employs a meta-profile as discussed herein, Alexandra may provide immediate feedback that may be used to update the meta-profile. The system may then adjust a weighting of preferences and corresponding marketing information for Alexandra, leading to improved product recommendations.

Continuing the example, now suppose that Alexandra discovers a new business-to-consumer organization, Globex. After receiving authorization from Alexandra, Globex accesses her meta-profile from the cloud computing service provider. Globex then provides a personalized experience in which Alexandra is greeted by name and provided with an accurate product recommendation based on her prior interaction with Acme. Further, when Alexandra has an issue and contacts Globex customer support, the customer support representative has access to Alexandra's comprehensive engagement history and preferences, allowing improved and personalized service despite Alexandra's limited prior interactions with Globex.

Conventional approaches to personal information management rely on disparate consumer profiles independently created and managed by different business-to-consumer companies. Further, such conventional approaches require business-to-consumer companies to develop consumer profiles slowly over time, leading to generalized personalization by consumer segment rather than for individual consumers. In contrast, various embodiments described herein provide for a single, universal profile that travels with an individual, facilitating a seamless and personalized customer experience with a business-to-consumer company using the profile, even in the absence of prior interactions between the company and the consumer. For example, experiences such as product or service purchase, returns, and/or reviews may be immediately personalized to a customer's preferences.

Conventional approaches to personal information management provide consumers with minimal control over the collection and distribution of their personal preferences and behavioral data, despite a typically painstaking process requiring consumers to engage in a time-consuming, company-by-company effort to curate personalization and data-sharing preferences. In contrast, various embodiments described herein allow consumers to take charge of their data privacy through electing how much of their meta-profile is shared with a business-to-consumer business. Such profiles strike a balance between personalization and granting consumers control and transparency, a important consideration in an era where personal information holds significant value.

Conventional approaches to personal information management involve inundating consumers with irrelevant content, creating "noise", while failing to amplify the "signal" of content that is genuinely appealing to the customer. In contrast, various embodiments described herein provide for a nuanced view of a consumer's interests and needs, enables a more sophisticated and comprehensive analysis of a consumer's preferences. Such an approach helps to avoid the "noise" of irrelevant content and instead facilitates the delivery of meaningful content for businesses employing the meta-profile. Such an approach may involve, for instance, an artificial intelligence algorithm using techniques such as multidimensional weighted scoring that facilitate a more sophisticated and comprehensive analysis of a consumer's preferences.

Conventional approaches for managing personal information include content recommendation algorithms that struggle with limited data and slow adaptation to consumer feedback, leading to poor handling of negative interactions and inaccurate content recommendations. Overemphasis on past behavior can create "filter bubbles," while generic personalization metrics and constant feedback requests can annoy consumers and raise privacy concerns. In contrast, various embodiments described herein allow content recommendation algorithms to update weighted scores in real-time or near real-time based on a consumer's most recent behavior and feedback. For example, if the consumer just searched for hiking jackets at a retailer, the consumer's meta-profile may be used to boost the weight for "outdoor activities" across all businesses that employ the meta-profile, leading to a better experience for both the business and the consumer.

Conventional techniques for recommending content such as commercial products and services on online platforms (e.g., Instagram, Facebook) can feel invasive and uncomfortable to consumers, raising questions about privacy and data security. The lack of visibility into, or control over, the algorithms tracking consumers and what happens with that data, increases consumers' feelings of mistrust. In contrast, various embodiments described herein involve sharing consumers' overall preferences with participating companies, but allowing consumers to retain control over data access for each specific company. The meta-profile can also seek real-time or near real-time feedback from customers and provide customers with transparent insights into the alignment between product recommendations and stored preferences (e.g., running shoes that are a 95% match).

Conventional approaches for managing the recommendation of content such as commercial products and services employ cookies to store, track, and personalize customer experience. However, increasing regulatory interest in personal data hinders companies' ability to successfully personalize at scale. In contrast, various embodiments described herein eliminate the need for many cookies since a meta-profile is owned and secured by a service provider of a computing services environment rather than by individual business-to-consumer companies. The meta-profile can dynamically update user preferences based on consumer feedback, enabling a personalized user experience regardless of the brand or website a consumer is interacting with.

Figure 1:
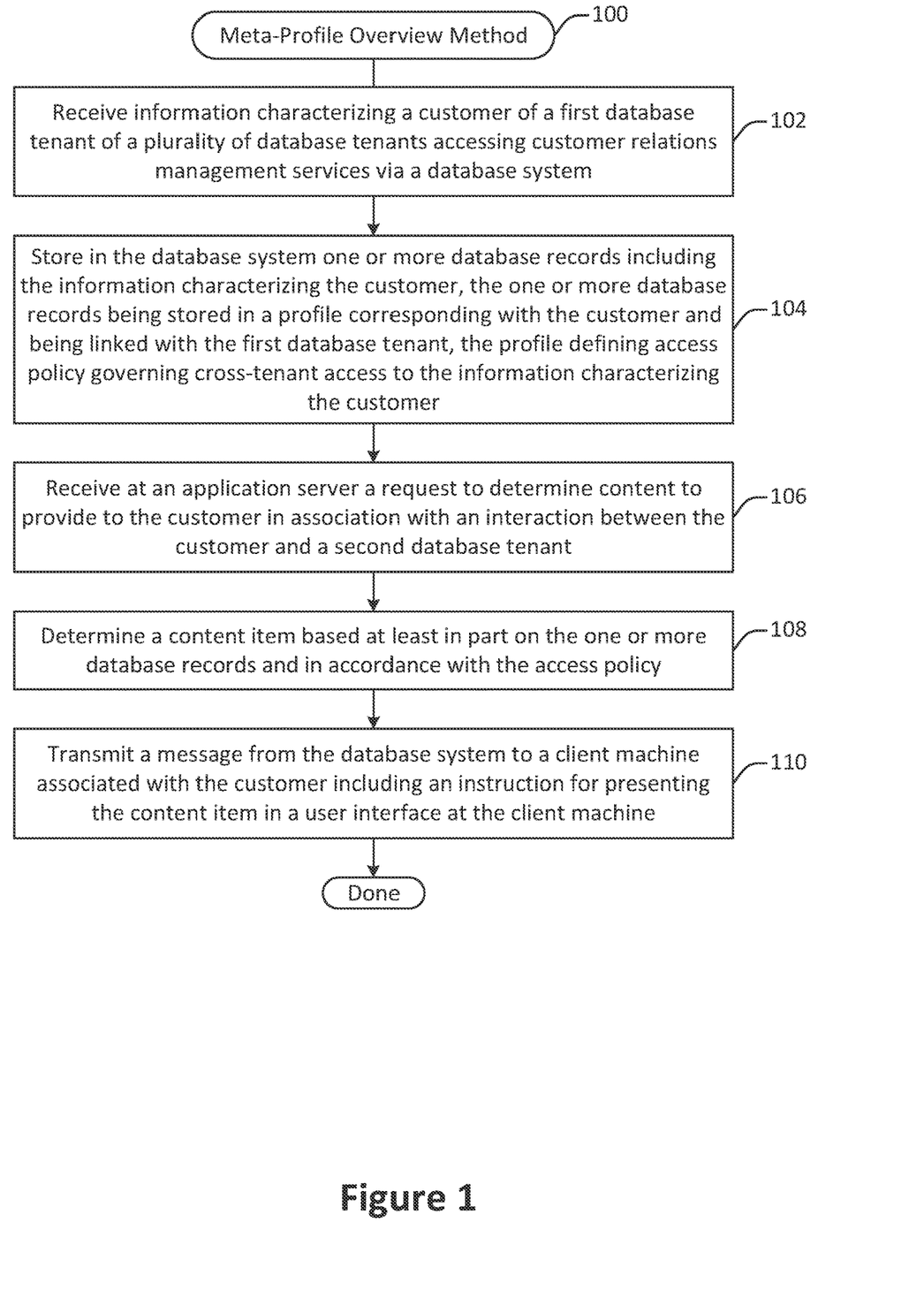
FIG. 1 illustrates a meta-profile overview method, performed in accordance with one or more embodiments.

FIG. 1 illustrates a meta-profile overview method 100, performed in accordance with one or more embodiments. The method 100 may be performed in order to generate, store, and apply a meta-profile. The method 100 may be performed at a computing services environment such as the computing services environment 200 shown in FIG. 2.

Information characterizing a customer of a database tenant of a plurality of database tenants is received at 102. In some embodiments, the database tenant may be one of a plurality of database tenants accessing customer relations management services via a database system at the computing services environment. The information may be received in the context of a customer interaction between the customer and the database tenant, for instance when the customer visits a digital storefront associated with the database tenant. The database system may store customer relations management including the customer data for the tenant. For instance, the digital storefront may be provided by an application server backed by the database system.

One or more database records including the information characterizing the customer are stored in the database system at 104. The records may be stored in a profile corresponding with the customer and linked with the first database tenant. The profile may define an access policy governing cross-tenant access to the information characterizing the customer. Additional details regarding the creation of such a profile, which is also described herein as a meta-profile, are discussed with respect to the method 300 shown in FIG. 3.

At 106, a request is received at an application server to determine content to provide to the customer in association with an interaction between the customer and a different database tenant. The second database tenant may correspond to, for instance, a different business accessing customer relations management services via the computing services environment. The interaction may be, for instance, a visit by the customer to a different digital store front corresponding with the second database tenant.

A content item is determined at 108 based at least in part on the one or more database records and in accordance with the access policy. In some embodiments, the content item may be determined by applying a preferencing process that selects an item based on preferences reflected in the profile. Additional details regarding the selection of content items based on a meta-profile are discussed with respect to the methods 500 and 600 shown in FIG. 5 and FIG. 6.

At 110, a message is transmitted from the database system to a client machine associated with the customer including an instruction for presenting the content item in a user interface at the client machine. In some embodiments, the user interface may be provided by the computing services environment. For instance, the user interface may be generated as part of a digital storefront provided by an application server within the computing services environment. Alternatively, the user interface may be provided from the second database tenant to the client machine. In such a configuration, the message may be transmitted directly to the client machine or may be transmitted to the client machine by way of an intermediary, for instance the second database tenant.

Figure 2:
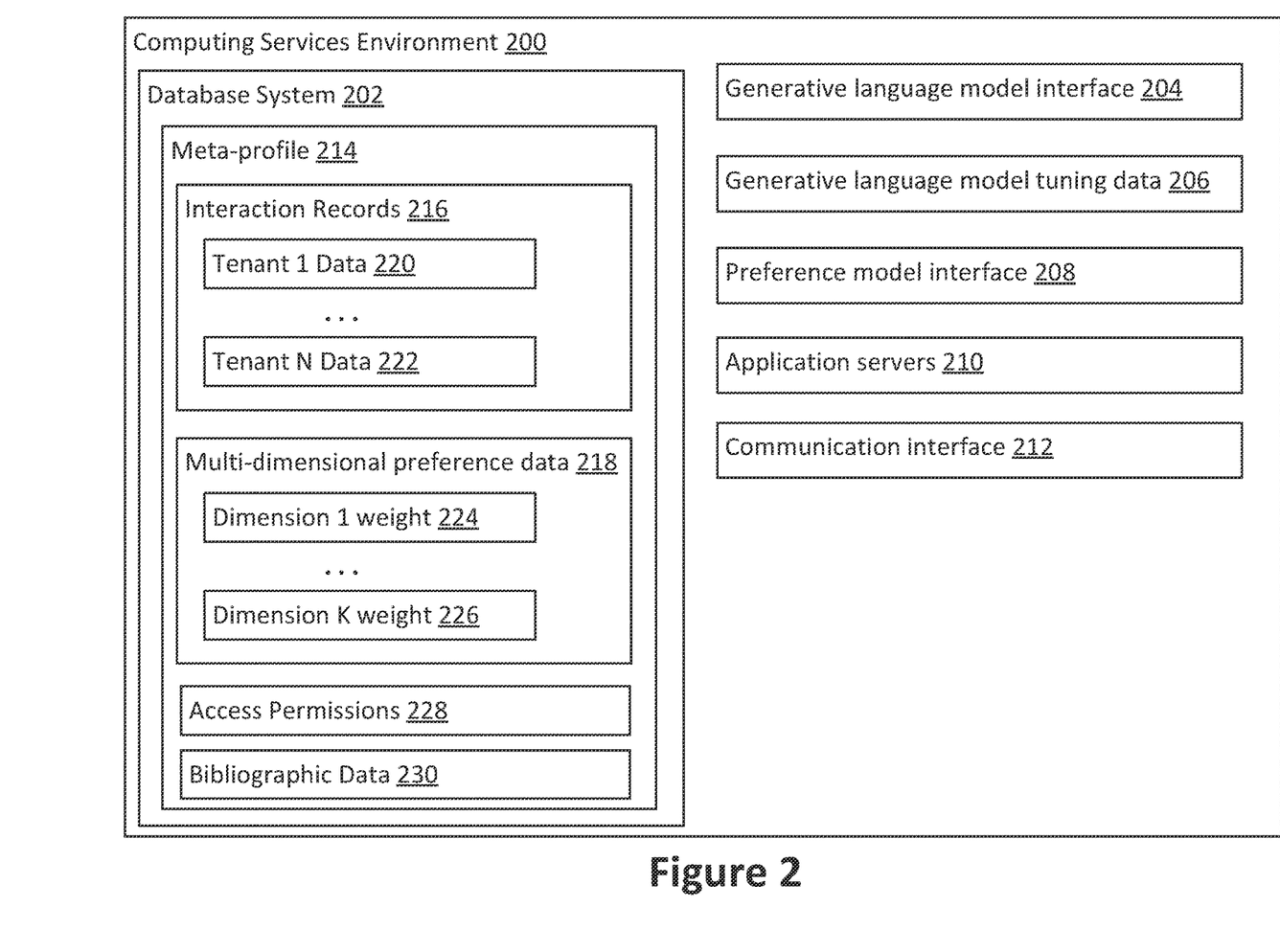
FIG. 2 illustrates a computing services environment, configured in accordance with one or more embodiments.

FIG. 2 illustrates a computing services environment 200, configured in accordance with one or more embodiments. The computing services environment 200 includes a database system 202, a generative language model interface 204, a generative language model tuning data repository 206, a preference model interface 208, one or more application servers 210, and a communication interface 212. The database system 202 stores a meta-profile 214, which includes interaction records 216, multi-dimensional preference data 218, access permissions 228, and bibliographic data 230. The interaction records 216 include tenant-specific interaction data such as the tenant 1 data 220 through the tenant N data 222. The multi-dimensional preference data includes weighting values for different dimensions of a preference model, such as the dimension 1 weight 224 through the dimension K weight 226.

According to various embodiments, the database system 202 may store customer relations management data and/or other data for various tenants accessing the computing services environment 200. The database system 202 may communicate with the application servers 210 to receive and/or provide access to such data. For instance, the one or more application servers 210 may provide access to one or more web applications through which database tenants (e.g., business-to-consumer companies) and/or customers of database tenants may store information to and/or retrieve information from the database system 202. Such communication may be conducted via the communication interface 212.

In some implementations, the database system 202 may be configured as a multitenant database system. However, techniques and mechanisms described herein are not limited to database systems configured in such a fashion. Thus, although different companies accessing computing services via the computing services environment 200 are sometimes referred to herein as tenants, the database system 202 need not be configured as a multitenant database, and instead tenant-specific data may be stored separately rather than in the same database table. Various configurations of the database system 202 are possible.

In some embodiments, the meta-profile 214 may correspond to a particular individual, such as a customer of one or more tenants of the computing services environment 200. Additional details regarding the creation and updating of a meta-profile 214 are discussed with respect to the methods 300 and 400 shown in FIG. 3 and FIG. 4.

In some implementations, the interaction records 216 may include database records reflecting interactions between the individual associated with the meta-profile and one or more tenants of the database system. For instance, the 216 may include records that reflect interactions such as: (1) preferences explicitly expressed by the consumer, (2) requests by the consumer to view particular products or services in a digital storefront, (3) information pertaining to search queries submitted in a digital storefront by the consumer, (4) purchases made by the consumer, (5) service requests made by the consumer, (6) goods or services returned by the consumer, and/or (7) any other information reflecting consumer preferences and/or interactions.

According to various embodiments, the access permissions 228 include information about which entities are permitted to access which information included in the meta-profile 214, as well as any contextual restrictions on such access. For instance, the user associated with the meta-profile 214 may allow one company to have complete access to the meta-profile data while permitting another company to access only a portion of the meta-profile data.

In some embodiments, the bibliographic data 230 includes information about the individual associated with the meta-profile 214 that transcends any particular interaction. For instance, the bibliographic data 230 may include information such as the individual's name, age, sex, gender, and the like.

According to various embodiments, the generative language model interface 204 may expose an application procedure interface through which one or more generative language models can be accessed. Such models may reside inside or outside the computing services environment 200. Examples of such generative language models include, but are not limited to, ChatGPT, Google Bard, Cohere, and Llama.

In some implementations, a generative language model may be tuned using information included in the data repository 206. For instance, the generative language model may be tuned using some or all of the information stored in a meta-profile to determine text adapted to a particular individual, database tenant, type of service or product, or other such category.

In some embodiments, the preference model interface 208 may provide access to a preference model that may be used to select products or services based on customer relations management data. For instance, the preference model interface 208 may be used to periodically update one or more weights reflecting consumer preferences such as the weights stored in the multi-dimensional preference data 218. The preference model interface 208 may then be configured to provide recommendations as to products or services based on those weights.

According to various embodiments, the multi-dimensional preference data 218 may include preferences that reflect a user's interactions. For example, the interaction records 216 may indicate that a user has purchased upcycled products, is loyal to environmentally friendly brands, and purchases travel tickets from airlines that employ carbon credits to offset emissions from flights. From such information, the computing services environment may determine that the user has a strong preference for environmentally conscious products and services.

In some implementations, the computing services environment 200 may be configured to perform one or more of the methods shown herein, such as the methods illustrated in FIG. 1, FIG. 3, FIG. 4, FIG. 5, and FIG. 6. For the purpose of illustration, some of the elements typically found in a computing services environment have been omitted from FIG. 2. For example, the database system 202 may include potentially many additional elements and store many additional data records beyond those shown in FIG. 2. As another example, the database system may store many different meta-profiles each corresponding with a different individual, while for the purpose of illustration only one such profile is shown in FIG. 2. Additional details regarding a computing services environment and the components and information included therein are described with respect to FIG. 6, FIG. 7, FIG. 8A, and FIG. 8B.

Figure 3:
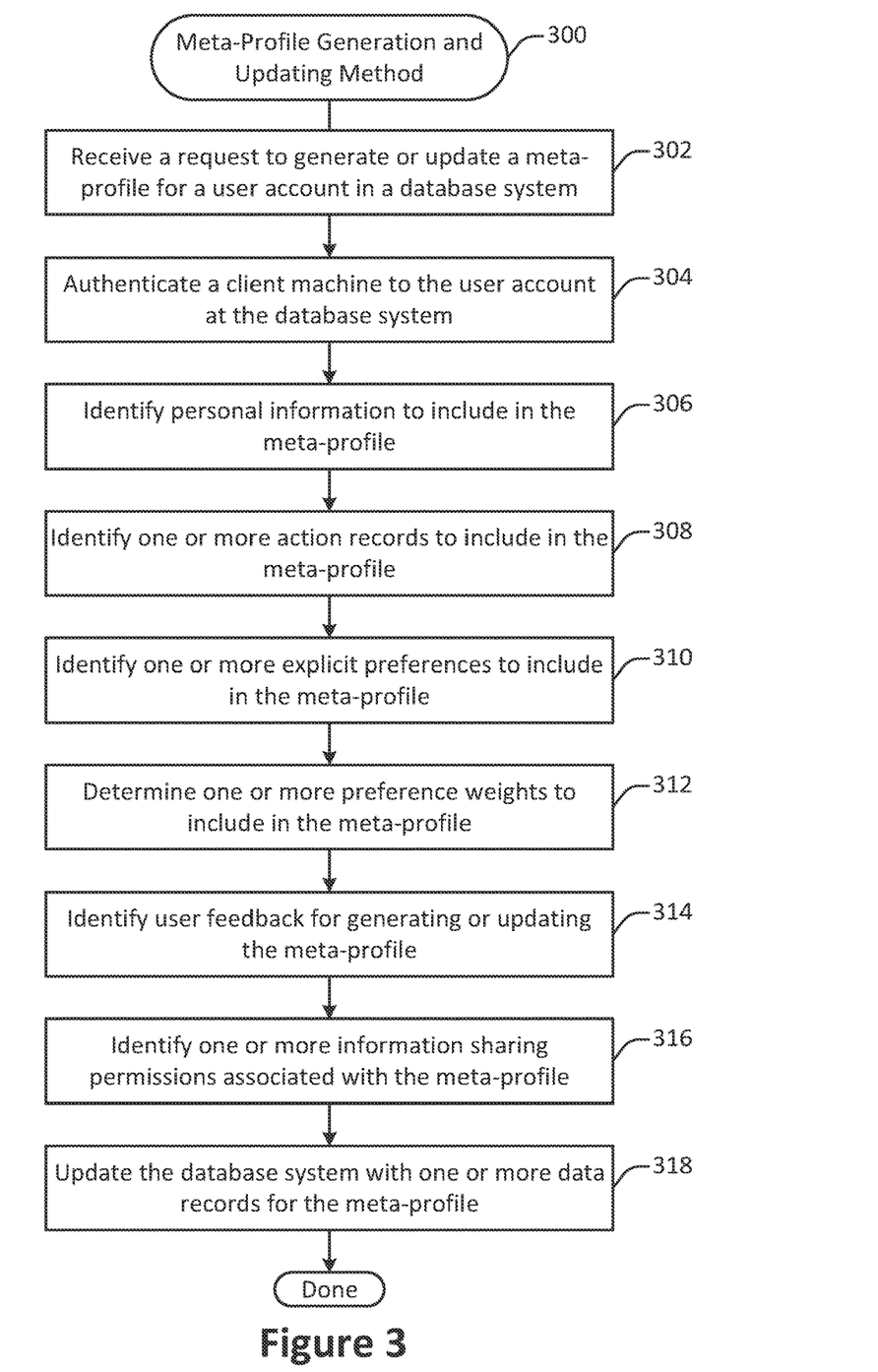
FIG. 3 illustrates a method of generating or updating a meta-profile, performed in accordance with one or more embodiments.

FIG. 3 illustrates a method 300 of generating or updating a meta-profile, performed in accordance with one or more embodiments. The method 300 may be performed at a computing services environment such as the computing services environment 200 shown in FIG. 2. Operations shown in the method 300 may involve communication between a client machine and a database system in a computing services environment. At least some of this communication may in some configurations be conducted at least in part via a database tenant, for instance through a digital storefront controlled by the database tenant.

A request to generate or update a meta-profile for a user account in a database system is received at 302. In some embodiments, the request may be generated based on user input. For instance, a user may be provided with an option to generate a meta-profile, such as when the user visits a digital storefront associated with a database tenant. The request may then be generated when the user provides user input indicating a desire to create the meta-profile. Alternatively, or additionally, the request may be generated dynamically. For instance, a process for generating a meta-profile may be initiated when a triggering condition is met, such as when activity is detected in association with the user account.

A client machine is authenticated to the user account at the database system at 304. In some embodiments, the client machine may be authenticated to the user account as part of an interaction between the client machine and a database tenant. For instance, the client machine may establish a communication session in which the client authenticates to a user account with a digital storefront associated with a database tenant. Information identifying the user account may then be received at the database system.

Personal information to include in the meta-profile is optionally identified at 306. According to various embodiments, personal information may include information such as a name, a billing address, a shipping address, a payment method, age, sex, gender, race, ethnicity, email address, and the like. Some such information may be provided explicitly by the user. Other such information may be received from another source, such as from the database tenant.

One or more action records to include in the meta-profile are optionally identified at 308. According to various embodiments, action records may include any database records that reflect interactions between the user account and the computing services environment and/or one or more tenants of the computing services environment. For example, an action record may reflect a transaction between the user account and a tenant of the computing services environment, a visit by the user account to a digital storefront associated with a tenant, a service request associated with the user account, feedback provided in association with the user account, and/or any other type of interaction.

One or more explicit preferences to include in the meta-profile are optionally identified at 310. In some embodiments, an explicit preference may include any indication of a preference or dispreference identified based on user input received in association with the user account. For instance, a user may provide feedback indicating that the user prefers or disprefers a particular product, class of products, service, class of services, and/or product or service characteristic.

One or more preference weights to include in the meta-profile are optionally determined at 312. In some embodiments, the preference weights may be values indicating the strength of user preferences on one or more dimensions. A preference model may include dimensions such as preferences for products or services related to sustainability, dogs, fashion, productivity, or any other topics that might be relevant to a merchant or service provider when interacting with the user account.

In some embodiments, the one or more preference weights may be determined by applying a multi-dimensional preference model to the action records, the explicit preferences, and/or the personal information. The multi-dimensional preference model may be applied not only to the information determined during the execution of the method 300, but also to any information previously stored in association with the meta-profile if an existing meta-profile was previously created.

User feedback for generating or updating the meta-profile is optionally received at 314. In some embodiments, the user feedback may include any revisions or additions to the information discussed with respect to the operations 306-312. For example, the user feedback may include a manual revision to a preference weight, to personal information, or to explicit preferences. Thus, the user may be provided with an opportunity to manually review the information included in the meta-profile for accuracy, completeness, privacy, and the like.

One or more information sharing permissions associated with the meta-profile are identified at 316. In some embodiments, the sharing permissions may be determined based on user input. The user may be able to specify permissions such as when and under what conditions information is shared from the service provider of the computing services environment to a tenant of the computing services environment. For example, the user may be able to classify the types of information discussed with respect to the method 300 as being fully shareable, shareable for the purpose of specific preferencing and content recommendation, or usable for the purpose of determining preference dimensions in a preference model. For example, the user may be able to classify these types of information as being private, limited to a particular database tenant, limited to a group of database tenants, or generally usable by various database tenants.

The database system is updated with one or more data records for the meta-profile at 318. In some embodiments, updating the database system may involve storing one or more of the types of data records included in the meta-profile 214 shown in FIG. 2.

Figure 4:
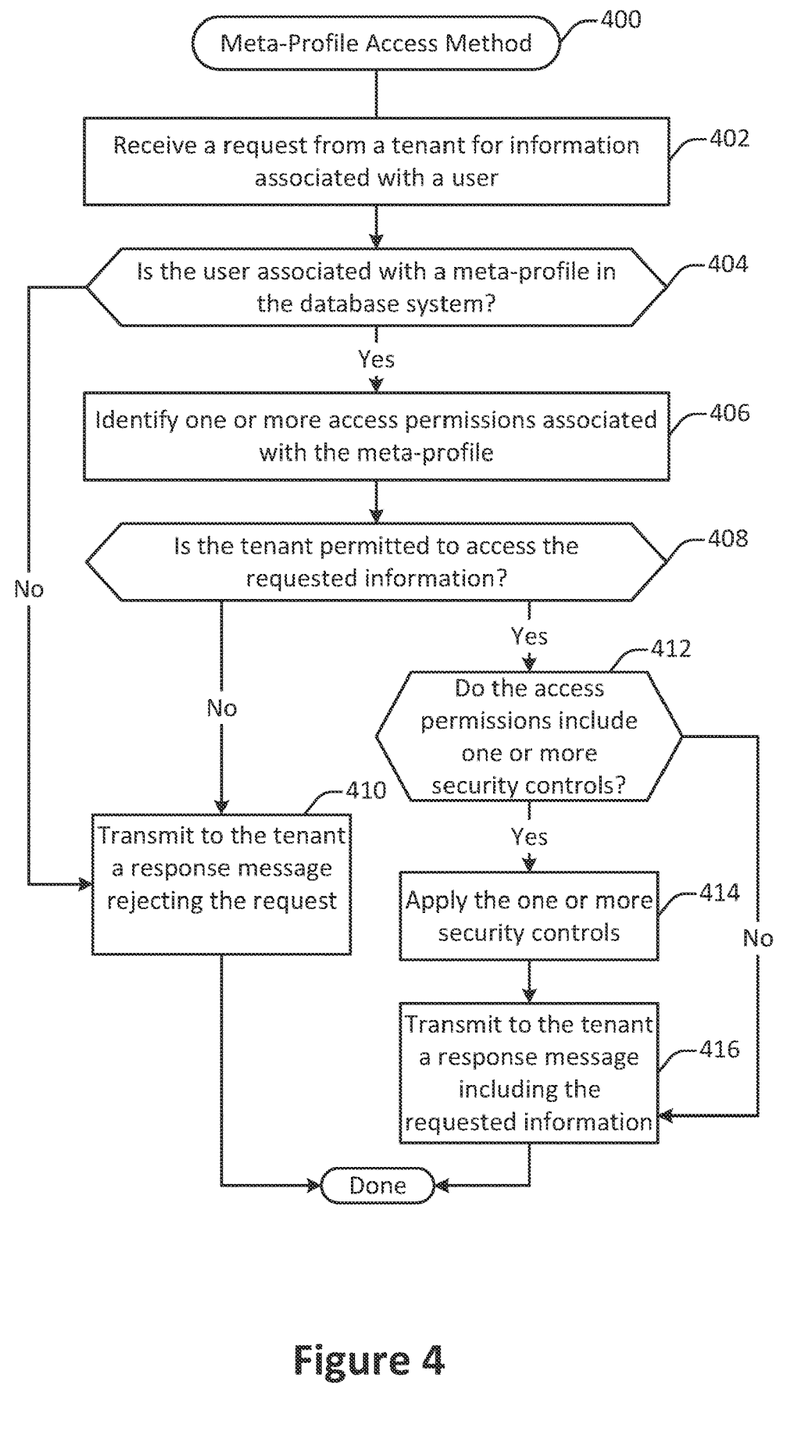
FIG. 4 illustrates a method of accessing a meta-profile, performed in accordance with one or more embodiments.

FIG. 4 illustrates a method 400 of accessing a meta-profile, performed in accordance with one or more embodiments. The method 400 may be performed at a computing services environment, such as the computing services environment 200 shown in FIG. 2.

A request is received at 402 from a tenant for information associated with a user that may have a meta-profile in the database system. In some embodiments, the request may be generated in the context of an interaction between the tenant and a user. For example, the user may visit a digital storefront associated with the tenant. As another example, the tenant may seek to send a message to the user. In such situations, information such as a preference, email address, or other such data included in the meta-profile may be useful to the tenant. The request received at 402 may identify particular information sought by the tenant or may be a general request for all available information.

According to various embodiments, the request received at 402 may be generated in any of various contexts. For instance, the request may seek to be generated to identify one or more product recommendations for the user, one or more webpage elements to display to the user, an advertisement to provide to the user, a message to transmit to the user, and/or any other type of personalized interaction between a database tenant and the user.

A determination is made at 404 as to whether the user is associated with a meta-profile. In some embodiments, the determination may be made by accessing the database system using, for instance, an identifier associated with the user.

Upon determining that the user is associated with a meta-profile, one or more access permissions associated with the meta-profile are identified. In some embodiments, the access permissions may be retrieved from the database system where they were stored as discussed with respect to FIG. 2 and FIG. 3.

A determination is made at 408 as to whether the tenant is permitted to access the requested information. In some embodiments, the determination may be made by comparing the information identified in the request received at 402 with the access permissions identified at operation 406.

Upon determining that the tenant is not permitted to access the requested information or that the user is not associated with a meta-profile, at 410 a response message rejecting the request is sent to the tenant.

Upon determining instead that the tenant is permitted to access the requested information, at 412 a determination is made as to whether the access permissions include one or more security controls. Upon determining that the access permissions include a security control, that security control is applied at 414.

According to various embodiments, various types of security controls may be employed. For example, information may be provided through a user interface provided by the database system and in a way that does not permit copying of the information. As another example, some types of information, such as personally identifying information, may be at least partially masked. As yet another example, some types of information, such as payment details, may be used to conduct operations such as payment processing but may not be revealed to the tenant.

At 416, information is provided to the tenant in a response message. The information may potentially be governed by one or more access controls as discussed with respect to operation 414.

Figure 5:
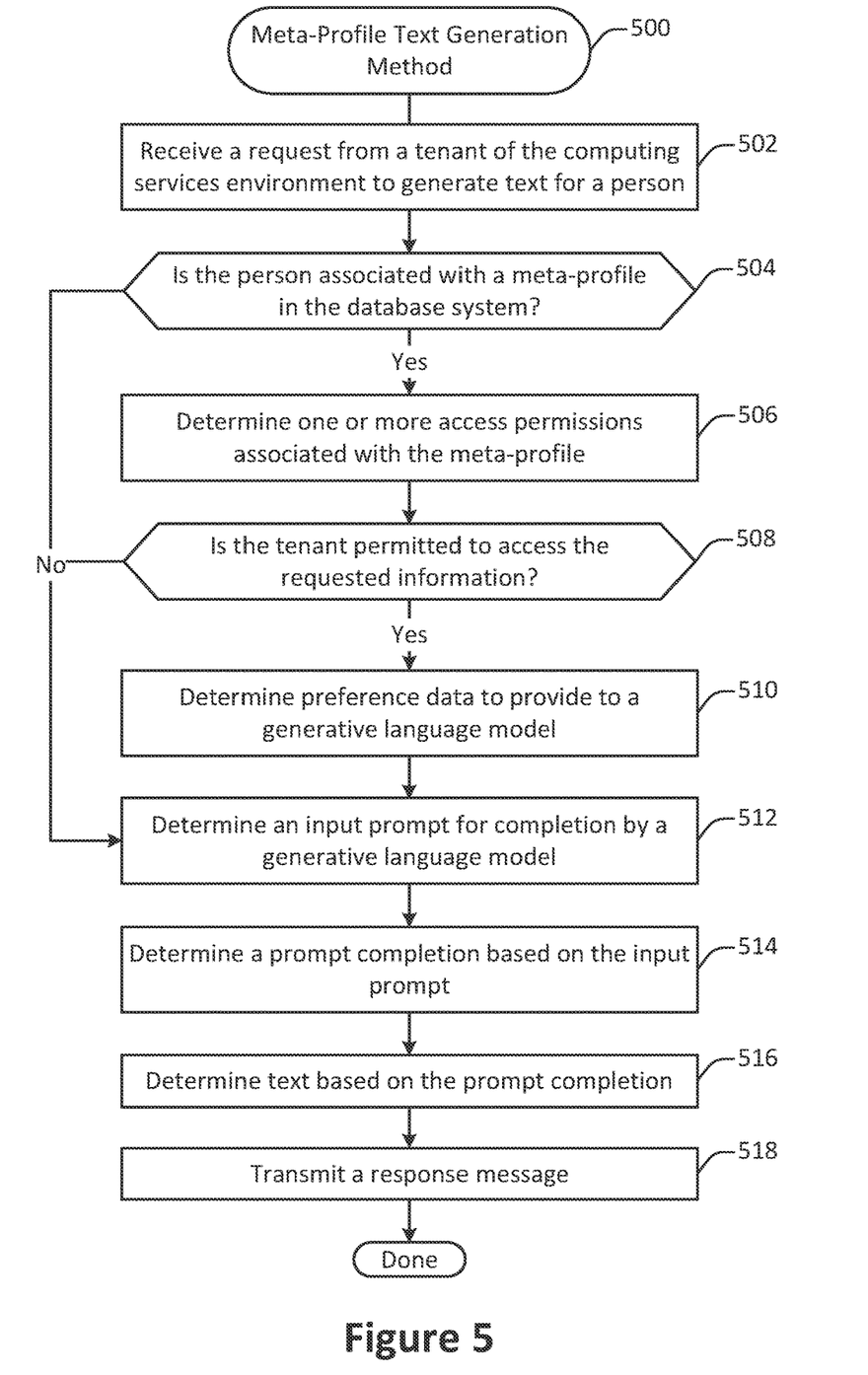
FIG. 5 illustrates a method of generating text based on a meta-profile, performed in accordance with some implementations.

FIG. 5 illustrates a method 500 for generating text based on a meta-profile, performed in accordance with one or more embodiments. The method may be performed at a computing services environment such as the computing services environment 200 shown in FIG. 2.

At 502, a request to generate text for a person is received from a tenant of the computing services environment. In some embodiments, the request may be received from an application server within the computing services environment. Alternatively, the request may be received from outside the computing services environment, or from a different source within the computing services environment. Thus, in some configurations the request may be received directly from the tenant. Alternatively, the request may be received from an application or service operating on behalf of the tenant in the course of providing computing services.

According to various embodiments, the request to generate text may be generated in any of a variety of contexts. For example, a digital store frontend application may generate the request in the course of communicating with the person via a live chatbot. As another example, the request may be generated in the course of determining an email, text message, or voice message to be transmitted to the person. As yet another example, the request may be generated by a system used by a human agent in the course of a voice call between the human agent and the person. As still another example, the request may be generated in the course of determining content to include in a web interface accessed by the person, such as determining one or more products to display in a webpage or digital storefront.

A determination is made at 504 as to whether the person is associated with a meta-profile in the database system. In some embodiments, the determination may be made by accessing a database system within the computing services environment using identifying information for the user, such as the user's name, account identifier, address, phone number, or the like.

Upon determining that the user is associated with a meta-profile in the database system, one or more access permissions associated with the meta-profile are determined at 506. In some implementations, determining the one or more access permission may involve retrieving the access permissions 228 shown in FIG. 2 from the database system 202.

A determination is made at 508 as to whether the tenant is permitted to access the requested information. In some embodiments, the determination may be made by evaluating the access permissions identified at 506. For example, the access permissions may be evaluated to determine whether the meta-profile indicates that all tenants are authorized to access the meta-profile for the purpose of text generation via a generative language model. As another example, the access permission may be evaluated to determine whether the meta-profile has granted permission to the specific tenant identified in the request to use the meta-profile for text generation. As yet another example, the access permissions may indicate that the person associated with the meta-profile needs to provide pre-approval before the meta-profile is used to generate novel text. In such a configuration, the computing services environment may transmit a message to a communication endpoint associated with the person to request pre-approval.

Preference data to provide to a generative language model is determined at 510. In some embodiments, the preference data may be selected from the meta-profile. For instance, the preference data may include the multi-dimensional preference data 218 shown in FIG. 2. In some configurations, additional data may be provided to the generative language model. For example, the generative language model may be provided with some or all of the interaction records 216, the bibliographic data 230, and/or any other relevant information about the user.

An input prompt for completion by a generative language model is determined at 512. In some implementations, the input prompt may be determined based on a prompt template. The prompt template may include one or more natural language instructions to be executed by the generative language model. The input prompt may also include one or more fillable portions that may be filled using dynamically determined text. For example, the prompt may be completed based on text received from a user as part of a chat session, text retrieved from the meta-profile, and/or contextual information identifying the purpose or context of the novel text.

According to various embodiments, the one or more natural language instructions may depend in part on the application for which the novel text is being generated. For example, in the context of a chat bot recommending a product, the natural language instruction may instruct the generative language model to "generate a response to the message from a user. Your response should identify a product that the user might like to purchase, along with a URL linking to the recommended product and a percentage match with the user's preferences." As another example, in the context of novel text provided to a sales representative speaking to a customer, a different natural language instruction may be used.

A prompt completion is determined at 514 based on the input prompt. In some embodiments, the prompt completion may include novel text generated by the generative language model based on the prompt. The prompt completion may be determined by providing the input prompt to the generative language model interface 204 shown in FIG. 2. The generative language model interface 204 may then receive a response message that includes the prompt completion.

In some embodiments, the generative language model may access any or all of the information included in the meta-profile 214. Such information may be included in the prompt or may be accessed in some other way. For instance, meta-profile information may be accessed via a vector store accessible to the generative language model.

Text is determined at 516 based on the prompt completion. Determining the text may involve extracting some or all of the novel text generated by the generative language model and included in the prompt completion.

A response message is transmitted at 518. According to various embodiments, the transmission of the response message may depend in part on the type and source of the request received at 502. For instance, the request may be transmitted to an application server, another system within the computing services environment, and/or an external system outside the computing services environment. The response message may include the text determined at 516. In some configurations, the text determined at 516 and/or the response message transmitted at 518 may be stored in the database system.

Figure 6:
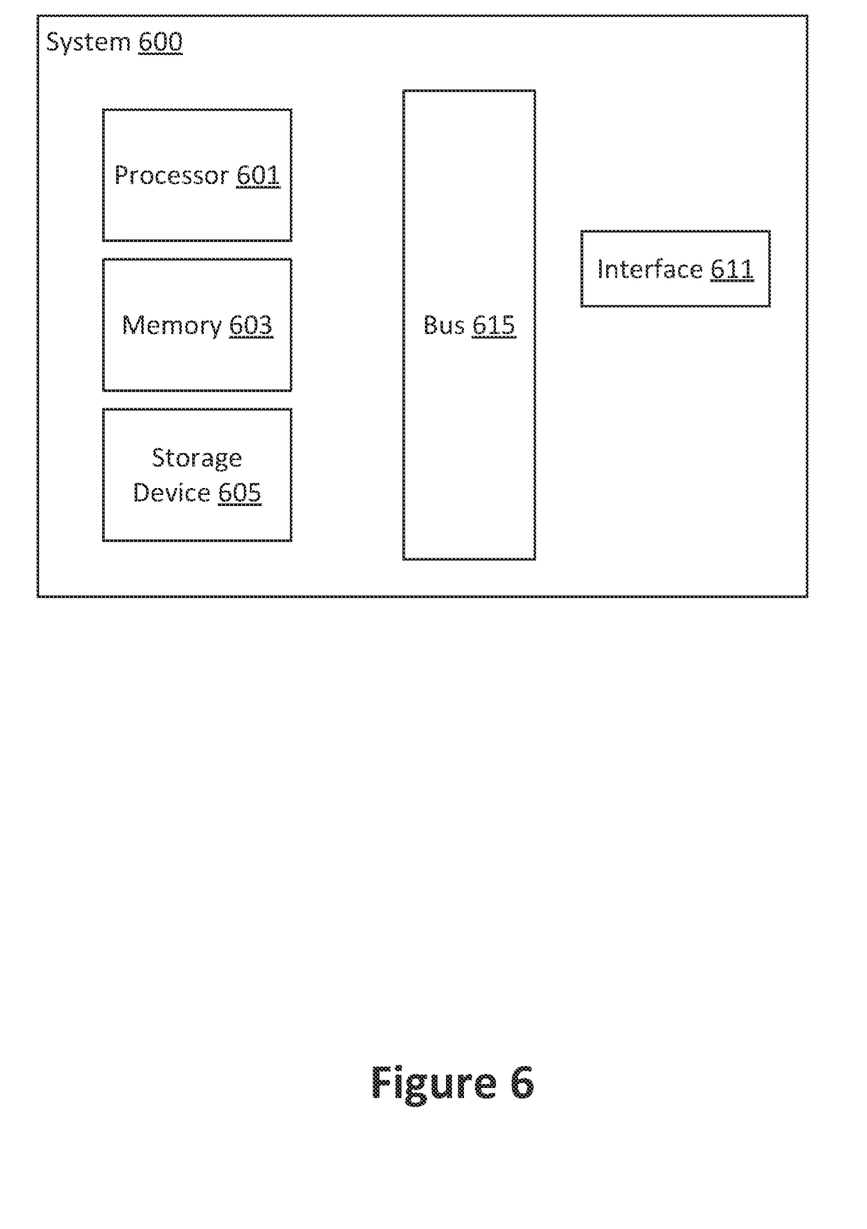
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 7:
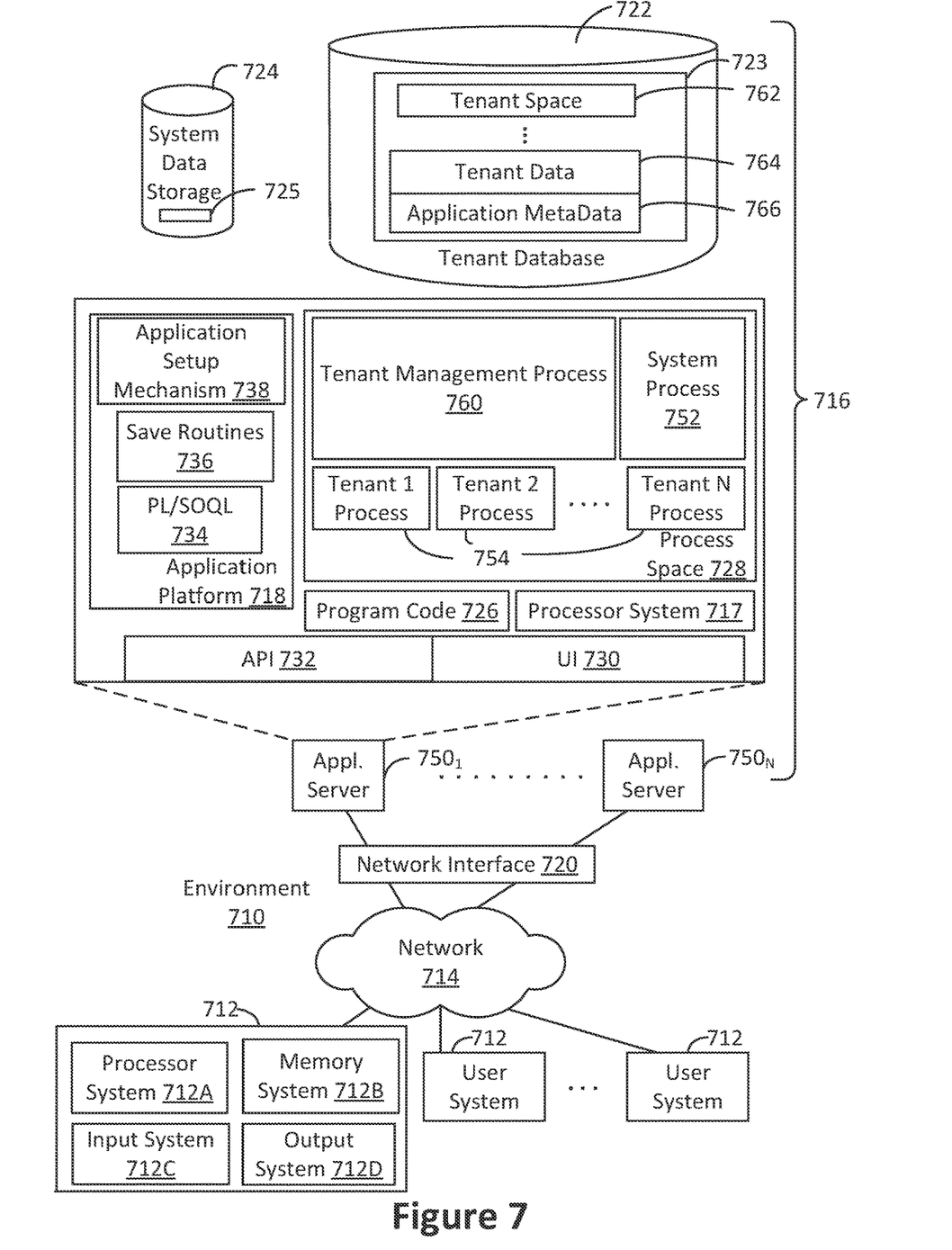
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based meta-profile system. For example, in some implementations, system 716 may include application servers configured to implement and execute software applications to collected and manage user interaction data and to provide content recommendations based on that user interaction data. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a meta-profile system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
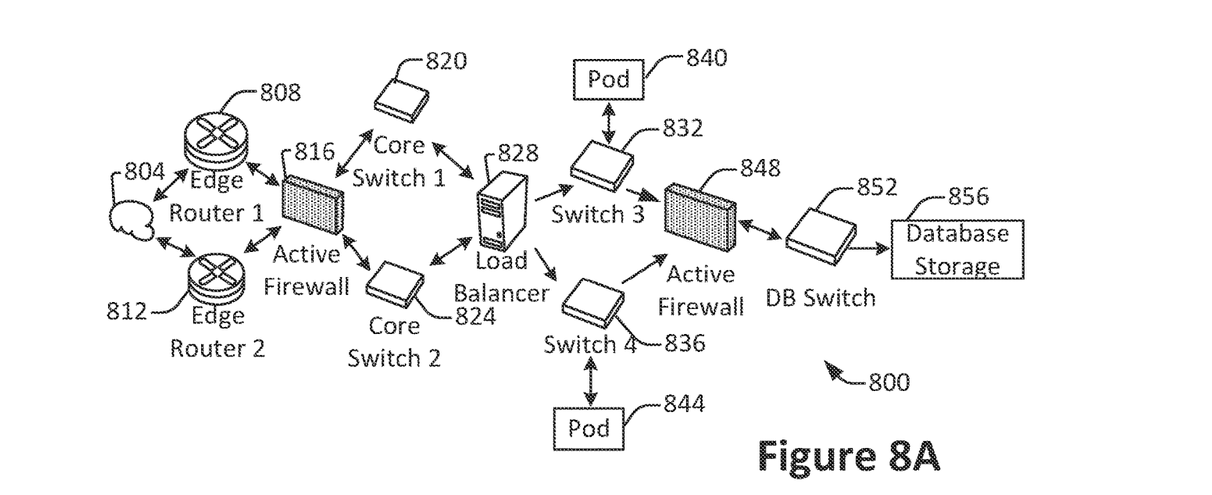
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process meta-profile information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
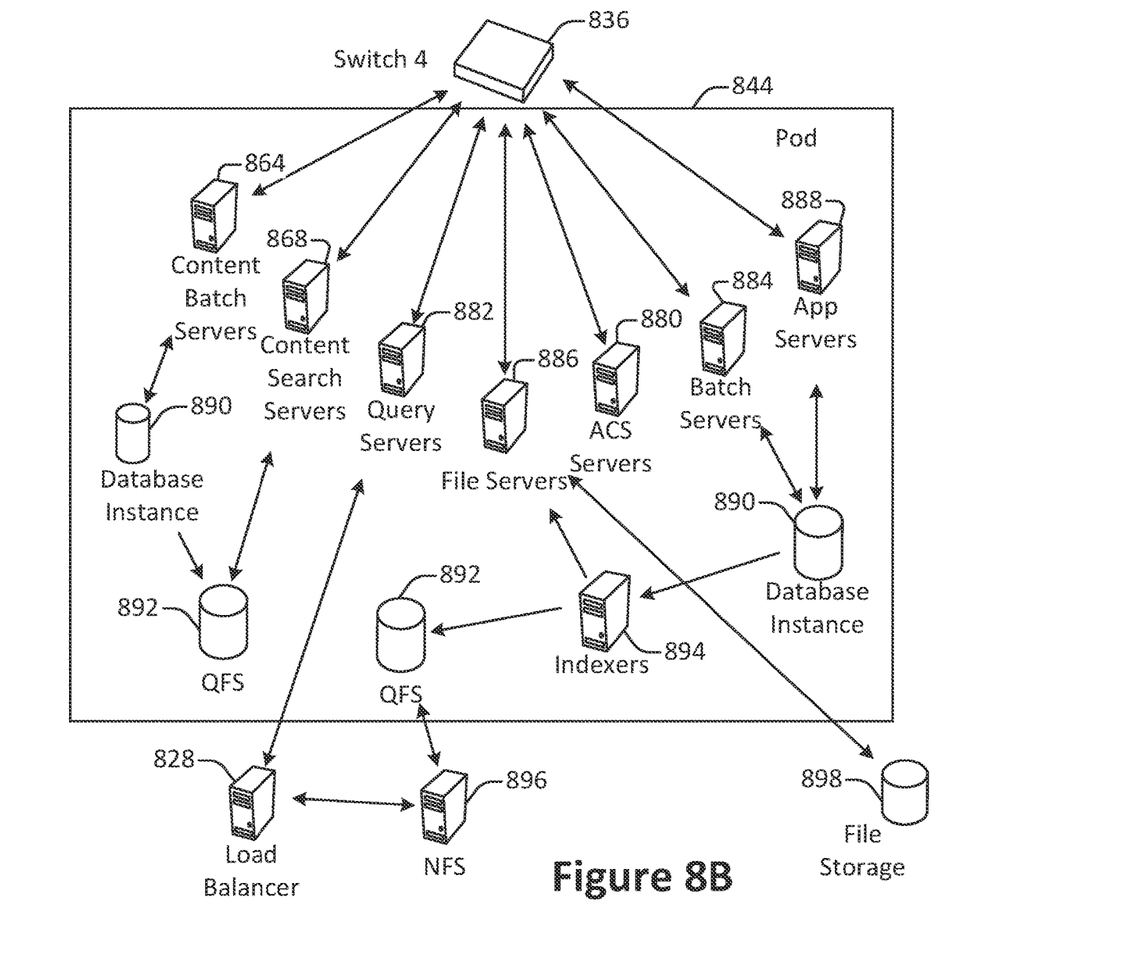
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   receiving via a communication interface information characterizing a customer of a first database tenant of a plurality of database tenants accessing customer relations management services via a database system, the information being determined based on one or more interactions between the customer and the first database tenant conducted via the database system;
   storing in the database system one or more database records including the information characterizing the customer, the one or more database records being stored in a profile corresponding with the customer, the one or more database records being linked with the first database tenant, the profile defining and access policy governing cross-tenant access to the information characterizing the customer;
   receiving at an application server at the database system a request to determine content to provide to the customer, the request being received in association with an interaction between the customer and a second database tenant of the plurality of database tenants;
   determining whether determining a recommended content item based on the one or more database records for the second database tenant is authorized by the access policy, at least in part by: (1) transmitting a first message to a client machine authenticated to a database account associated with the customer, and (2) receiving an access authorization message from the client machine;
   determining the recommended content item based at least in part on the one or more database records, the recommended content item being determined in accordance with the access policy, wherein determining the recommended content item involves determining an input prompt based on a prompt template including a fillable portion, the input prompt and the prompt template each including a natural language instruction to identify the recommended content item, wherein determining the input prompt includes filling the fillable portion with prompt input information selected from the one or more database records; and
   transmitting from the database system to the client machine a second message including an instruction for presenting the recommended content item in a user interface at the client machine.

2. The method recited in claim 1, wherein the recommended content item is determined based at least in part on a designated preference weight of plurality of preference weights, the designated preference weight quantifying a designated preference for the customer along a designed dimension.

3. The method recited in claim 2, wherein the one or more database records include a first database record identifying a stated preference value determined based on user input received from the customer and expressly indicating a stated preference.

4. The method recited in claim 2, wherein the designated preference weight is determined by evaluating the one or more interactions between the customer and the first database tenant conducted via the database system.

5. The method recited in claim 1, wherein the access policy prohibits direct access to the one or more database records by the second database tenant, wherein the access policy permits access to the one or more database records to determine the recommended content item on behalf of the second database tenant.

6. A system comprising:
   a communication interface information receiving information characterizing a customer of a first database tenant of a plurality of database tenants accessing customer relations management services, the information being determined based on one or more interactions between the customer and the first database tenant conducted via a database system;

a database system storing one or more database records including the information characterizing the customer, the one or more database records being stored in a profile corresponding with the customer, the one or more database records being linked with the first database tenant, the profile defining and access policy governing cross-tenant access to the information characterizing the customer;

an application server receiving a request to determine content to provide to the customer, the request being received in association with an interaction between the customer and a second database tenant of the plurality of database tenants, the application server being configured to determine whether determining a recommended content item based on the one or more database records for the second database tenant is authorized by the access policy, at least in part by: (1) transmitting a first message to a client machine authenticated to a database account associated with the customer, and (2) receiving an access authorization message from the client machine;

a hardware processor configured to determine content item based at least in part on the one or more database records, the recommended content item being determined in accordance with the access policy, wherein determining the recommended content item involves determining an input prompt based on a prompt template including a fillable portion, the input prompt and the prompt template each including a natural language instruction to identify the recommended content item, wherein determining the input prompt includes filling the fillable portion with prompt input information selected from the one or more database records, wherein the communication interface is configured to transmit from the database system to the client machine a second message including an instruction for presenting the recommended content item in a user interface at the client machine.

7. The system recited in claim 6, wherein the processor is further operable to determine whether determining the recommended content item based on the one or more database records for the second database tenant is authorized by the access policy, and wherein determining whether determining the recommended content item based on the one or more database records for the second database tenant is authorized by the access policy comprises transmitting a message to a client machine, the client machine being authenticated to a database account associated with the customer and receiving an access authorization message from the client machine.

8. The system recited in claim 6, wherein the recommended content item is determined based at least in part on a designated preference weight of plurality of preference weights, the designated preference weight quantifying a designated preference for the customer along a designed dimension.

9. The system recited in claim 8, wherein the one or more database records include a first database record identifying a stated preference value determined based on user input received from the customer and expressly indicating a stated preference.

10. The system recited in claim 8, wherein the designated preference weight is determined by evaluating the one or more interactions between the customer and the first database tenant conducted via the database system.

11. One or more non-transitory computer readable media having instructions stored thereon for performing a method, the method comprising:

receiving via a communication interface information characterizing a customer of a first database tenant of a plurality of database tenants accessing customer relations management services via a database system, the information being determined based on one or more interactions between the customer and the first database tenant conducted via the database system;

storing in the database system one or more database records including the information characterizing the customer, the one or more database records being stored in a profile corresponding with the customer, the one or more database records being linked with the first database tenant, the profile defining and access policy governing cross-tenant access to the information characterizing the customer;

receiving at an application server at the database system a request to determine content to provide to the customer, the request being received in association with an interaction between the customer and a second database tenant of the plurality of database tenants;

determining whether determining a recommended content item based on the one or more database records for the second database tenant is authorized by the access policy, at least in part by: (1) transmitting a first message to a client machine authenticated to a database account associated with the customer, and (2) receiving an access authorization message from the client machine;

determining the recommended content item based at least in part on the one or more database records, the recommended content item being determined in accordance with the access policy, wherein determining the recommended content item involves determining an input prompt based on a prompt template including a fillable portion, the input prompt and the prompt template each including a natural language instruction to identify the recommended content item, wherein determining the input prompt includes filling the fillable portion with prompt input information selected from the one or more database records; and transmitting from the database system to the client machine a second message including an instruction for presenting the recommended content item in a user interface at the client machine.

* * * * *